United States Patent
Rick (10) Patent No.: US 8,038,169 B2
(45) Date of Patent: Oct. 18, 2011

(54) RESTRAINT SYSTEM FOR FRONT VEHICLE OCCUPANTS

(75) Inventor: Ulrich Rick, Roxheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 140 days.

(21) Appl. No.: 12/266,489

(22) Filed: Nov. 6, 2008

(65) Prior Publication Data

US 2009/0121462 A1    May 14, 2009

(30) Foreign Application Priority Data

Nov. 7, 2007  (DE) .......................... 10 2007 052 974

(51) Int. Cl.
*B60R 21/16* (2006.01)
(52) U.S. Cl. ........................................................ 280/732
(58) Field of Classification Search .................. 280/729, 280/730.1, 732
See application file for complete search history.

(56) References Cited

U.S. PATENT DOCUMENTS

| | | | |
|---|---|---|---|
| 5,230,530 A | 7/1993 | Iriyama et al. | |
| 6,391,470 B1 * | 5/2002 | Schmieder et al. | 428/598 |
| 7,264,268 B2 * | 9/2007 | Ehrke | 280/729 |
| 2003/0001366 A1 | 1/2003 | Debler et al. | |
| 2005/0161918 A1 | 7/2005 | Bito | |
| 2006/0163848 A1 | 7/2006 | Abe | |

FOREIGN PATENT DOCUMENTS

| | | |
|---|---|---|
| DE | 19860823 A1 | 7/2000 |
| DE | 19904100 A1 | 8/2000 |
| EP | 0861762 A1 | 9/1998 |

OTHER PUBLICATIONS

Chinese Patent Office, Chinese Office Action for Chinese Application No. 200810174855.0, dated Jul. 30, 2010.

* cited by examiner

*Primary Examiner* — Faye M. Fleming
(74) *Attorney, Agent, or Firm* — Ingrassia Fisher & Lorenz, P.C.

(57) ABSTRACT

A restraint system is provided that includes, but is not limited to at least one airbag module having an airbag having at least one chamber for front vehicle occupants in a vehicle, a space at a distance from the windshield between dashboard and front vehicle occupant being fillable using the airbag by unfolding. To improve the vehicle comfort and the passenger safety according to the current and future requirements and provide more interior space, the airbag module is fastenable to a vehicle body structure forming the front vehicle interior, the restraint system being implemented using an airbag enlarged by a depth (T) of a dashboard.

20 Claims, 6 Drawing Sheets

RESTRAINT SYSTEM FOR FRONT VEHICLE OCCUPANTS

CROSS-REFERENCE TO RELATED APPLICATION

This application claims priority to German Patent Application No. 102007052974.2, filed Nov. 7, 2007, which is incorporated herein by reference in its entirety.

TECHNICAL FIELD

The present invention relates to a restraint system having at least one airbag module and an airbag having at least one chamber for front vehicle occupants in a vehicle, a space at a distance to the windshield between dashboard and front vehicle occupants being fillable using the airbag by unfolding. The invention also relates to a production method of a restraint system.

BACKGROUND

Situating restraint systems in a dashboard on the passenger side of a vehicle is known. The restraint system is usually implemented as an airbag module and is used to restrain the upper body, in particular the chest area including the head, from a hard impact on the dashboard in case of a crash. Furthermore, the following prior art is known.

For example, EP 0 861 762 B1 describes a passenger airbag having an inflatable airbag which is divided into three separate inflatable chambers, a central and two lateral chambers. US 2005/0161918 A1 describes an airbag device for front vehicle occupants having an upper and a lower inflatable section. US 2006/0163848 A1 describes an airbag having an upper lengthened section, which covers an A-column and thus protects the head of the vehicle occupant in case of crash. DE 199 04 100 A1 describes an airbag configuration having a space in front of the passenger seat which is free of the dashboard. The airbag is situated in a centrally situated console below the windshield or on an A-column for the passenger or additionally also for the driver having a diagonal movement direction in each case.

In view of the foregoing, it is at least one object to provide a restraint system which improves the vehicle comfort and the passive safety according to the current and future requirements and provides more interior space. In addition, other objects, desirable features, and characteristics will become apparent from the subsequent summary and detailed description, and the appended claims, taken in conjunction with the accompanying drawings and this background.

SUMMARY

The at least one object, other objects, desirable features, and characteristics, are achieved in that the airbag module is fastenable to a vehicle body structure forming the front vehicle interior, the restraint system unfolding in the inflated state from a dashboard-free space in the direction of the vehicle occupant. This has the advantage that the vehicle interior in front of the vehicle occupant may be designed variably, thus increasing the vehicle comfort. The restraint system is situated as far forward as possible in the vehicle interior. A larger vehicle interior usable in manifold ways is thus provided. The airbag module having an airbag may protect a front vehicle occupant just as well as a typical airbag according to the prior art, which is located at a significantly shorter distance directly in front of the front vehicle occupant in the dashboard. The airbag having at least one chamber or, in the event of multiple chambers, having a main chamber is advantageously inflated in the vehicle longitudinal direction. A direct and short restraint path is thus implemented opposite to the main forward movement of the vehicle. A compensated inflation procedure diagonally or transversely to the vehicle longitudinal direction is avoided.

The restraint system is advantageously situated on a windshield crossbeam, which supports a bottom side of the windshield, or a splash board on the vehicle body structure forming the front vehicle interior. The windshield crossbeam or the splash board has the required rigidity and strength to withstand the forces generated by the gas generator of the airbag.

The restraint system is situated on the passenger side. This has the advantage that the otherwise typical dashboard, which occupies a large space in the area in front of the passenger, may essentially be left out on the passenger side and its free space may be designed individually according to the requirements of the customer. The vehicle interior in front of the passenger no longer necessarily has to have a dashboard to integrate the typically housed passenger airbag as a restraint system.

The airbag is thus preferably essentially implemented as enlarged by the depth T of a dashboard exclusively situated on the driver side. The airbag has a so-called thorax chamber. A thorax chamber essentially restrains the chest and head area of a front vehicle occupant from a hard impact with vehicle interior parts. The airbag module is dimensioned overall correspondingly to such an enlarged airbag. An airbag module having an airbag according to the invention may thus be situated very far forward to the windshield and protect the front vehicle occupants in a typical way.

According to a preferred embodiment, the airbag is implemented as lengthened by approximately 300 mm to 500 mm depending on the vehicle type. This lengthening is the relocation of the airbag module toward the area of a windshield base in relation to a typical airbag module configuration. A windshield base is to be understood as a windshield crossbeam, which may also comprise a splash board.

According to a further preferred embodiment of the invention, the airbag has a lateral extension for cushioning in relation to one or more lateral A-columns. This is important because current aerodynamically designed vehicle bodies have increasingly implemented the A-column with a small distance to the head. The lateral extension for cushioning in relation to an A-column is also important in particular because, according to an embodiment of the present invention, the dashboard is essentially implemented on the driver side up to the central console and is not provided on the passenger side, so that the passenger may shift his seat very far forward in this area and may thus independently decrease the head distance to the A-column. To be protected in case of a frontal crash with and without lateral energy introduction, a lateral extension on the airbag is therefore extremely advantageous as an additional lateral A-column cushion.

A further especially preferred embodiment of the invention has an airbag having an upper extension for cushioning in relation to a front roof frame structure. This additional clearly pronounced upper extension is important essentially for the same reasons as the extension for cushioning in relation to an A-column, on the one hand because the modern aerodynamic vehicle body structures currently run close to the head and on the other hand because the passenger may independently move the head distance to the front roof frame further forward, because the passenger shifts the seat further forward than is the case in typical vehicles having a dashboard on the passenger side.

To protect the passenger in relation to the possibly closer central console because of a passenger seat adjusted forward, the airbag preferably has a lateral extension for cushioning in relation to the central console. To also protect the foot extremities of a front vehicle occupant, the airbag has a lower extension for cushioning foot extremities.

According to a further preferred embodiment of the invention, a separate leg airbag module is situated for the foot area, which is particularly coupled to the thorax chamber for activation with the airbag module. A separate leg airbag module has the advantage that the foot area is also rapidly protected in case of a frontal crash, because the build up of a restraint cushion is to occur very rapidly, in particular in fractions of a second.

According to a further preferred embodiment, the airbag has a thorax chamber and/or a head chamber. Head and thorax are the preferred body areas which are to be restrained using an airbag. The other body areas are restrained using a belt system.

According to a further preferred embodiment of the invention, above all for countries in which using seatbelts is not required, the airbag is implemented in such a way that the thorax chamber of the airbag, in particular together with the airbag of the leg airbag module, envelops the entire front contour of a vehicle occupant. A front vehicle argument is thus restrained in case of a frontal crash of the vehicle, even if his safety belt is not buckled.

In a further preferred embodiment, the airbag is implemented as a multi-chamber airbag, this has the advantage that the airbag unfolds and is inflated in stages. In a special embodiment, the multi-chamber airbag has tear seams which partition off the individual chambers. The tear seams are designed in such a way that they tear open from the velocity of the inflowing gas inflating the airbag and also inflate the individual chambers. In another embodiment, overflow openings may alternatively or additionally be provided in the multi-chamber airbag.

In a special embodiment, the airbag has catch straps, this has the advantage that the airbag or parts of the airbag may be kinematically controlled and its extension may be exactly redirected in regions.

According to a further preferred embodiment, the airbag module has a gas generator having one or more triggering stages.

According to a further preferred embodiment, the airbag module has a variable continuous gas generator.

According to a special embodiment, the airbag has at least one or more light airbag fabrics or different light airbag fabrics for each airbag section. This has the advantage that the airbag, as a function of its strain as well as airbag/chamber pressures, is lightly retained and occupies the least possible packing volume of the folded airbag in the vehicle.

Because the volume of the airbag according to an embodiment of the invention is very large, it is especially expedient to fold the airbag in a chamber under vacuum. This additionally reduces the packing volume by approximately 30%.

The at least one object, other objects, desirable features, and characteristics, are also achieved by a production method of a restraint system having the features described above in that, for a single chamber or multi-chamber airbag, extensions on the airbag are tucked therein to fold together the airbag.

It is obvious that the features cited above and to be explained hereafter are usable not only in the particular specified combination, but rather also in other combinations.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the application and uses. Furthermore, there is no intention to be bound by any theory presented in the preceding background and summary or the following detailed description.

Figure 1:
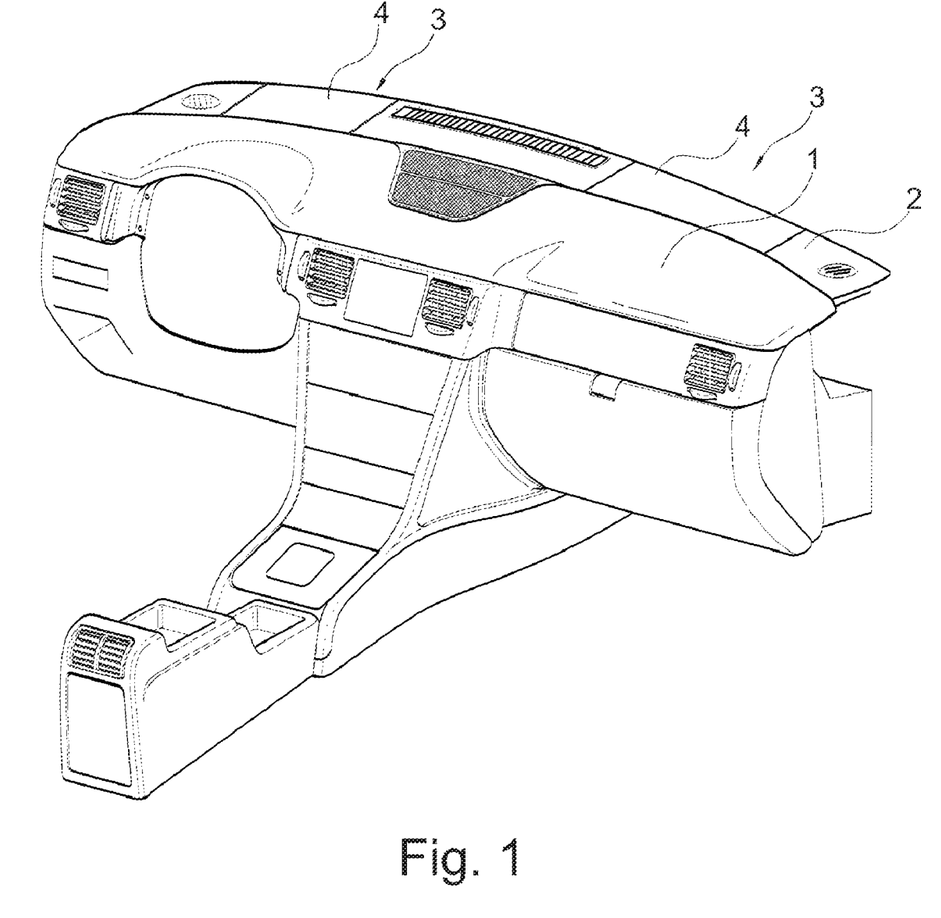
FIG. 1 shows a perspective view of a front vehicle interior having a restraint system according to an embodiment of the invention.

FIG. 1 shows a perspective view of a dashboard 1, which extends over the driver and passenger sides and projects on both sides essentially equally far from a windshield (not shown) into a vehicle interior. The restraint system 3 according to an embodiment of the invention is located behind a panel 2 of a windshield crossbeam in particular on the passenger side and optionally also on the driver side. The restraint system 3 comprises an airbag module having a gas generator and an airbag, which is situated concealed behind a cover 4. The cover 4 is torn open upon detection of an accident and the airbag is inflated to protect the front passenger. The configuration of an airbag module is fastenable to the windshield crossbeam, which supports the windshield on the bottom side, and/or to a front vehicle body structure which follows the external vehicle body contour and forms the front vehicle interior.

Figure 2:
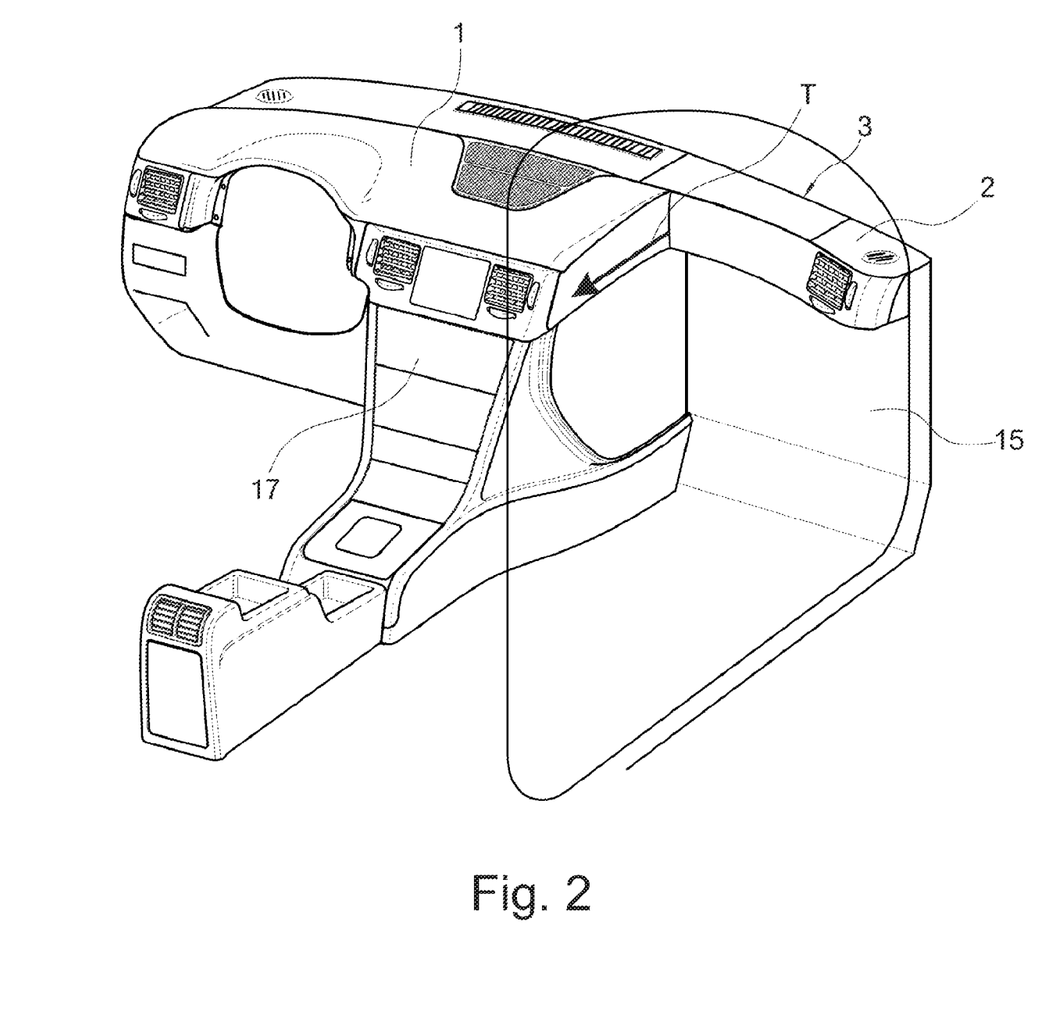
FIG. 2 shows a perspective view of a front vehicle interior having a dashboard on the driver side.

FIG. 2 shows a perspective view of a special design of the dashboard 1. The dashboard 1 is essentially only implemented on the driver side, including the central console 17. The dashboard 1 has been left out on the passenger side. The vehicle body structure forming the front vehicle interior in front of the passenger seat, which comprises a splash board 15, a windshield crossbeam 6, and a front side wall, is covered by a simple panel 2, which does not significantly project into the inner chamber.

As is obvious from FIG. 2, an enormous space increase results on the passenger side. The passenger may thus shift the passenger seat extremely far forward into the depth T of the dashboard 1. Dispensing with the dashboard 1 on the passenger side thus also provides a very great leg freedom for the passenger. Distances from the passenger to a hard vehicle body structure, such as an A-column (not shown), which may also comprise multiple A-columns, and a front roof frame structure, are thus significantly decreased. The distance to the central console 17 may also be shorter. The path from the airbag is simultaneously enlarged if the passenger sits at the level of the driver, because the airbag module 3 is situated relocated further forward in the range from approximately 300 mm to approximately 500 mm in relation to typical vehicles. According to an embodiment of the invention, the airbag and the entire airbag module 3 are adapted to this altered vehicle interior design. The airbag protects the passenger, as shown in the following figures, in especially hazardous accident situations, which result from the altered vehicle interior design. The altered vehicle interior design has the advantage of weight reduction, cost savings, and consumption and CO2 emission reduction.

Figure 3:
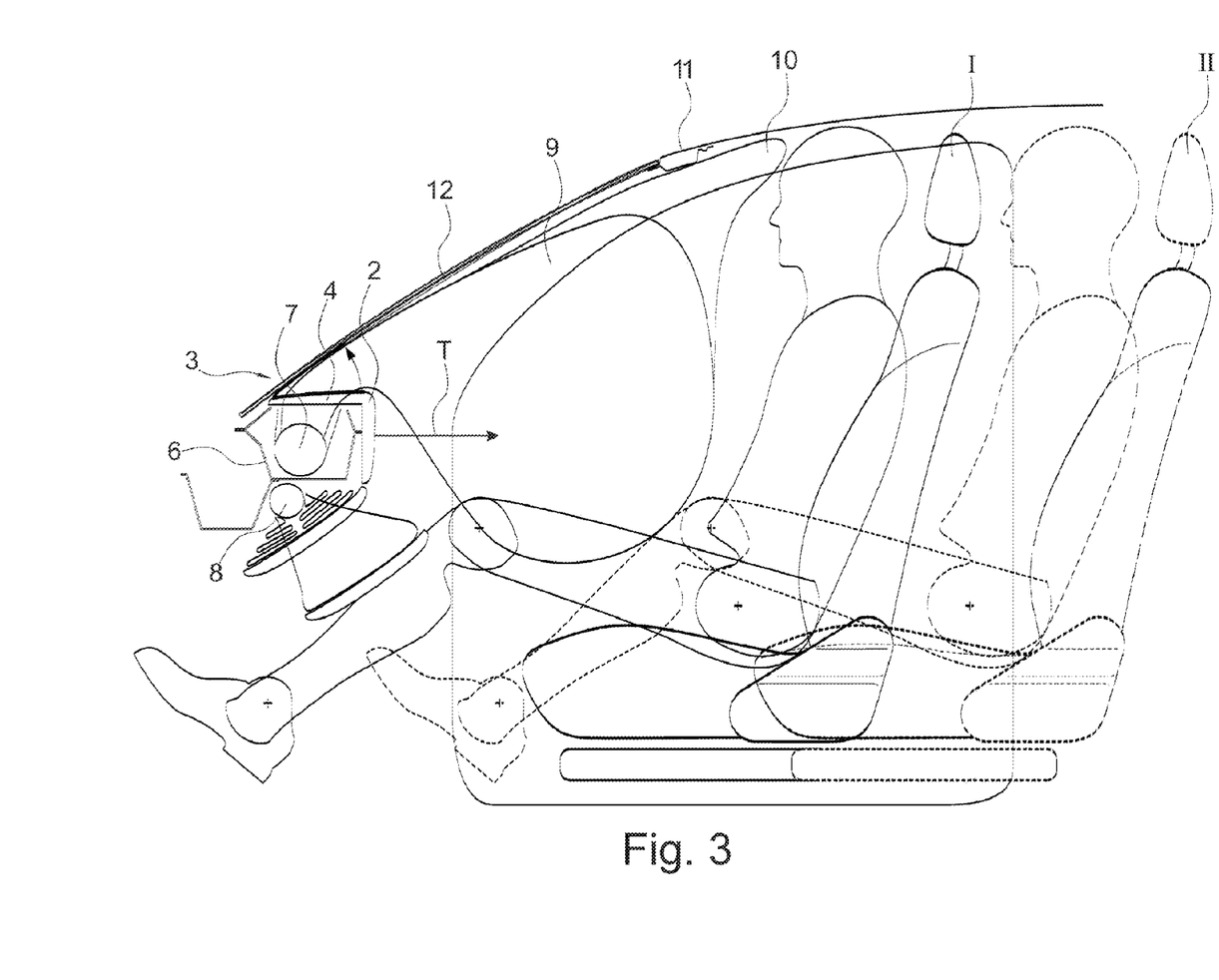
FIG. 3 shows a schematic cross-sectional view of the restraint system according to an embodiment of the invention.

FIG. 3 schematically shows the vehicle interior on the passenger side in cross-section, having a schematically shown passenger in two seat positions I, II. In a first seat position I, in which the passenger has shifted the passenger seat extremely far forward, and in a second seat position II, in which the passenger seat is situated approximately at the level of the driver seat, and is typically occupied in vehicles which have a dashboard 1 projecting into the vehicle interior on the passenger side, as shown in FIG. 1.

The restraint system 3 is situated on an external windshield crossbeam 6. The restraint system 3 comprises, in the special embodiment shown in FIG. 3, two airbag modules 7, 8. The airbag module 7 is housed in a trough which is open on top. The airbag module 7 comprises a large airbag 9, enlarged by the depth T of the dashboard 1, which is to restrain the thorax and the head of the passenger. A further airbag extension 10 is implemented on the airbag 9 to support the head of the passenger on the front roof frame structure 11. This is important, because the passenger is seated significantly closer to the front roof frame structure 11 in the seat position I, as shown in FIG. 3.

The airbag 9 is located in a folded state behind a panel 2 of the windshield crossbeam 6. Upon triggering of the airbag module 7, a cover 4 is folded against the windscreen 12 by tearing open of the panel 2. And the airbag 9 is guided parallel to the windshield into the passenger interior.

As a special design, FIG. 3 shows a leg airbag module 8, which is fastened to the windshield crossbeam 6 from below. The panel 2 of the windshield crossbeam 6 also covers the leg airbag module 8. The leg airbag module 8 is used to support and protect the lower extremities of the passenger and in particular protects the knee and foot areas of the passenger. The lower extremities are placed very far into proximity to the windshield crossbeam 6 in the seat position I. The airbag module 7 and the leg airbag module 8 are coupled to one another for activation in case of a crash. They are thus triggered essentially simultaneously.

Figure 4:
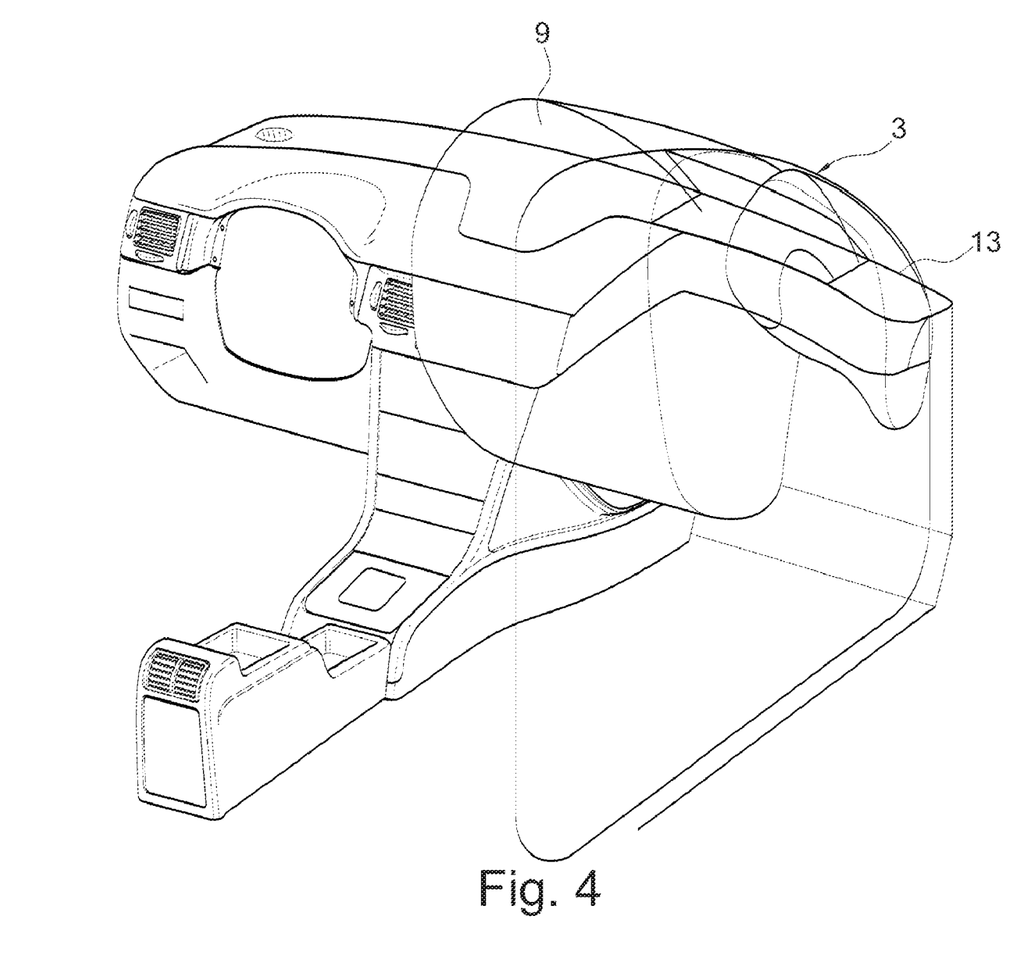
FIG. 4 shows a perspective view of the restraint system according to an embodiment of the invention having an extension on the thorax chamber.

FIG. 4 shows the restraint system 3 according to an embodiment of the invention in a perspective design having an inflated airbag 9, a further airbag extension 13 being implemented on the side on the airbag 9. The airbag extension 13 is used to cover the A-column, which may possibly comprise two columns, an A1 and an A2 column. The restraint system 3 may thus also be referred to as a so-called "corner airbag". The corner airbag covers the entire inner vehicle corner of the passenger side and offers a protection potential for a frontal impact and additionally for superimposed angled crashes (angled impact), i.e., for the cases in which the occupants are moved by the lateral energy introduction in the direction of the A-column, but a possible laterally provided head airbag is not triggered by the system, because the corresponding sensors do not recognize a side crash.

Figure 5:
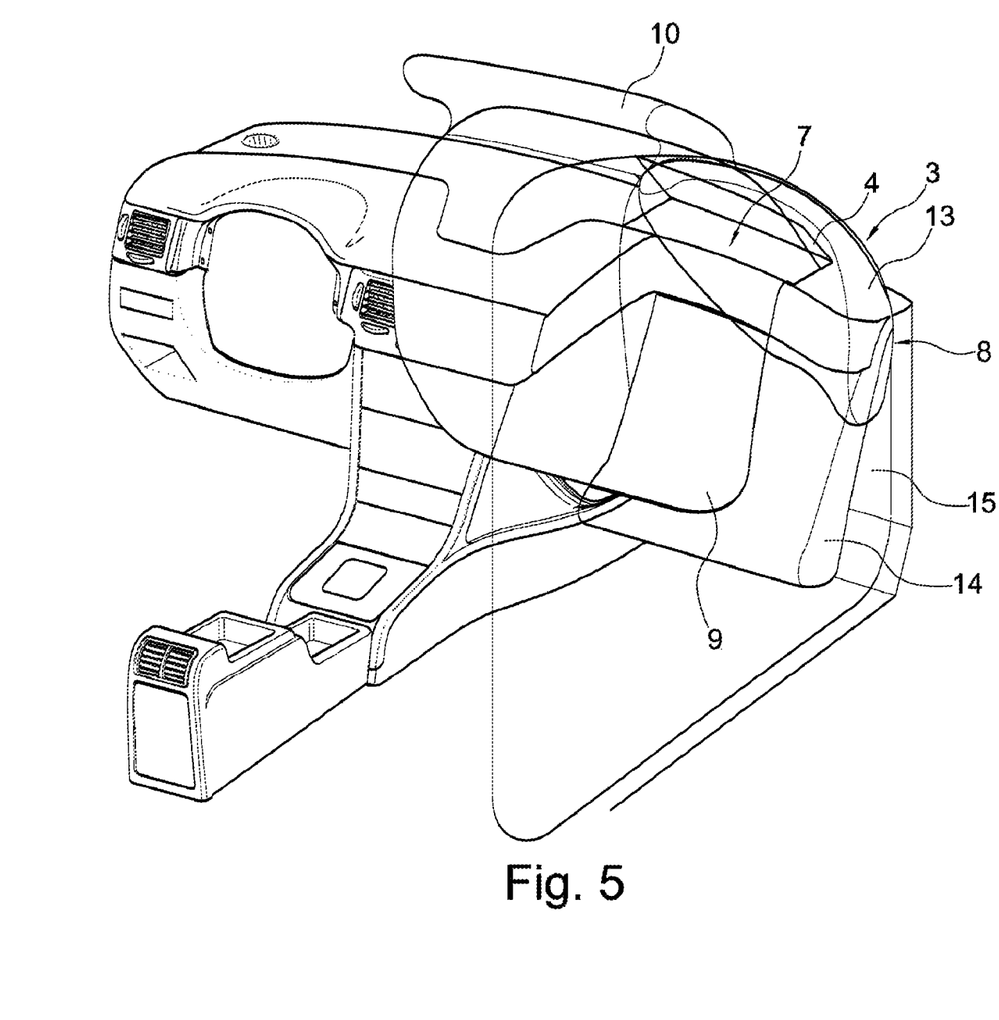
FIG. 5 shows a perspective view of the restraint system according to an embodiment of the invention having at least three extensions on a thorax chamber.

FIG. 5 shows the restraint system 3 according to an embodiment of the invention in a perspective view according to the cross-sectional view of FIG. 3. In FIG. 5, the cover 4, which covers the airbag module 7, is folded open and the airbag 8, which forms a thorax chamber, is inflated. An airbag extension 10, which supports the head against the upper windshield and the front roof frame structure (not shown in this figure) and possibly against the area of the roof adjoining the roof frame, is also shown. The airbag 9, which is implemented as a single-chamber airbag, has lateral airbag extensions 10 and 13, which are tucked into the airbag 9 during the production of the restraint system 3 to fold together the airbag 9. As described in FIG. 4, an airbag extension 13 is located on the airbag 9 to protectively cover the corner to the A-column.

FIG. 5 also shows the leg airbag 14 resulting from the leg airbag module 8 shown in FIG. 3. The leg airbag 14 protects the lower extremities in relation to the hard front vehicle body structure of the vehicle interior, which is implemented above all by a splash board 15. The airbag 9 may also be implemented as a multi-chamber airbag and have overflow openings to the airbag extensions 13 and 10 and also additional tear seams to the airbag extensions 10 and 13.

Figure 6:
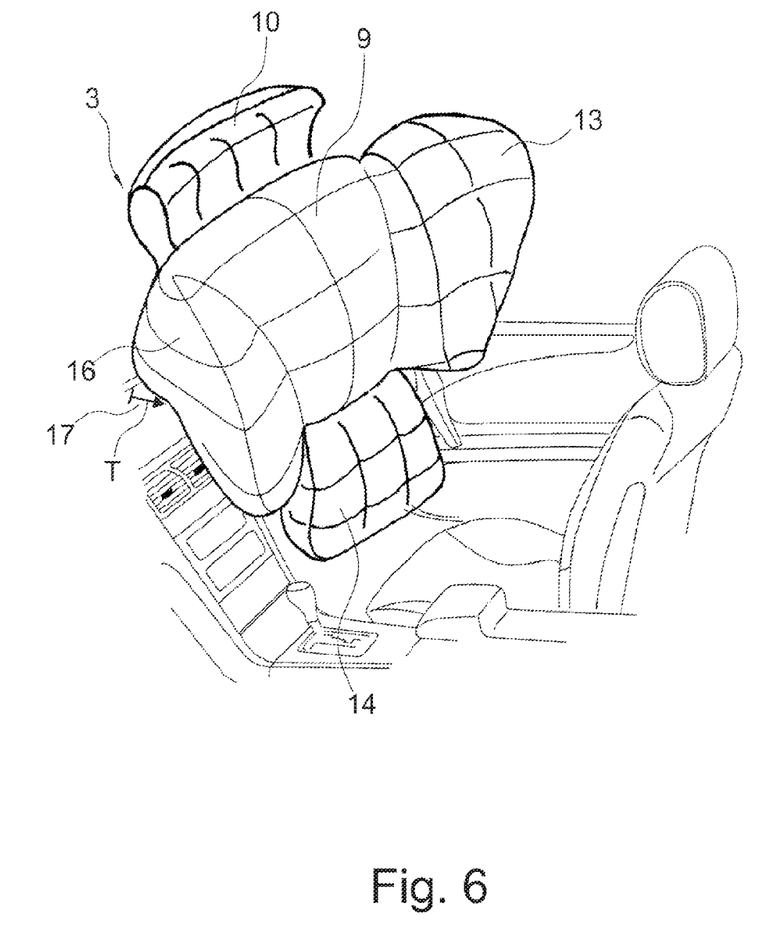
FIG. 6 shows a perspective view of a completely inflated airbag.

FIG. 6 shows a perspective view of a further alternative embodiment of the restraint system 3 having a main chamber, the so-called thorax chamber, which implements the airbag 9, and having airbag extensions on four sides which are significantly enlarged and expanded in relation to the prior art. The leg airbag 14 is attached directly to the airbag 9 in this special embodiment. A further airbag 16 offers an impact protection for the passenger in relation to the central console 17. The airbag 9 is clearly visibly implemented as enlarged in depth according to an embodiment of the invention in relation to the previously known prior art in this figure, because the airbag is fastened to the windshield crossbeam 6. The airbag 9 may advantageously completely envelop a front contour of the passenger and thus supports the belt system significantly better. In particular, the representation in drawing of all figures is referred to as essential for the invention. The figures only show a schematic illustration, which is not to scale.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed summary and description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A restraint system for a vehicle, comprising:
an airbag module comprising an airbag;
at least one chamber of the airbag for a front vehicle occupant on a passenger side of the vehicle; and
a space at a distance to a windshield of the vehicle between a dashboard and a front vehicle occupant position that is adapted to fill with an unfolding of the airbag, wherein:
the dashboard is left out on the passenger side of the vehicle leaving a dashboard-free space;
the airbag module is fastened to a windshield crossbeam, the windshield crossbeam supporting a bottom side of the windshield; and
the airbag unfolding in an inflated state from the dashboard-free space in a direction of the front vehicle occupant position.

2. The restraint system according to claim 1, wherein the airbag has a lateral airbag extension for cushioning in relation to at least one lateral A-column.

3. The restraint system according to claim 1, wherein the airbag has an upper airbag extension for cushioning in relation to a front roof frame structure.

4. The restraint system according to claim 1, wherein the airbag has a leg airbag for cushioning foot extremities.

5. The restraint system according to claim 1, wherein the airbag has a lateral airbag extension for cushioning in relation to a central console.

6. The restraint system according to claim 1, wherein a separate leg airbag module is situated for a foot area that is particularly coupled to an upper airbag module for activation.

7. The restraint system according to claim 1, wherein the airbag has at least one of a thorax chamber or a head chamber.

8. The restraint system according claim 6, wherein the airbag of the upper airbag module envelops an entire front contour of a vehicle occupant.

9. The restraint system according to claim 1, wherein the airbag is implemented as a multi-chamber airbag.

10. The restraint system according to claim 9, wherein the multi-chamber airbag has at least one tear seam that partition a plurality of chambers.

11. The restraint system according to claim 9, wherein the multi-chamber airbag has an overflow opening.

12. The restraint system according to claim 1, wherein the airbag module has a gas generator having at least one triggering stages.

13. The restraint system according to claim 1, wherein the airbag module has a variable gas generator.

14. The restraint system according to claim 1, wherein the airbag comprises at least one light airbag fabric for each section of the airbag.

15. The restraint system according to claim 1, wherein the airbag is folded in a chamber under vacuum.

16. The restraint system according to claim 1, wherein the dashboard is exclusively situated on a driver side of a front vehicle interior of the vehicle.

17. The restraint system according to claim 16, wherein the airbag is adapted to enlarge by a depth (T) of the dashboard.

18. The restraint system according to claim 1, the front vehicle occupant position corresponding to the passenger side of a front vehicle interior of the vehicle, wherein the dashboard does not occupy space in front of the front vehicle occupant position.

19. The restraint system of claim 1, further comprising a second airbag module fastened to the windshield crossbeam, the second airbag module including a leg airbag for cushioning foot extremities.

20. A restraint system for a vehicle, comprising:
an airbag module comprising an airbag, the airbag module being fastened to a windshield crossbeam supporting a bottom side of a windshield of the vehicle;
at least one chamber of the airbag for a front vehicle occupant on a passenger side of a front vehicle interior of the vehicle; and
a dashboard exclusively situated on a driver side of the front vehicle interior to provide a dashboard-free space on the passenger side of the front vehicle interior, the airbag unfolding in an inflated state from the dashboard-free space in a direction of the front vehicle occupant.

* * * * *